No. 652,124. Patented June 19, 1900.
H. LEITNER.
CONTROLLING ELECTRIC MOTORS AND APPARATUS THEREFOR.
(Application filed July 10, 1899.)
(No Model.) 6 Sheets—Sheet 1.
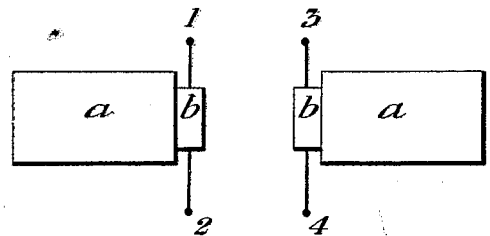
Fig. 1.
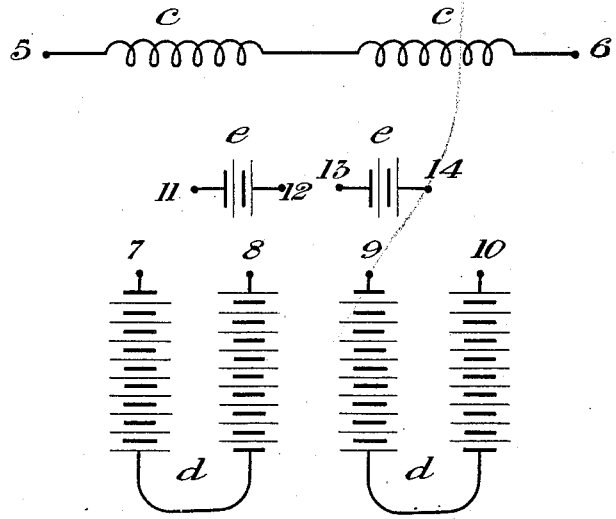
Fig. 2.
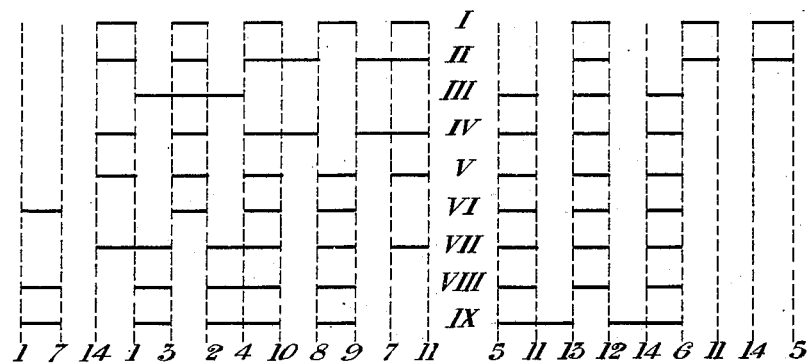

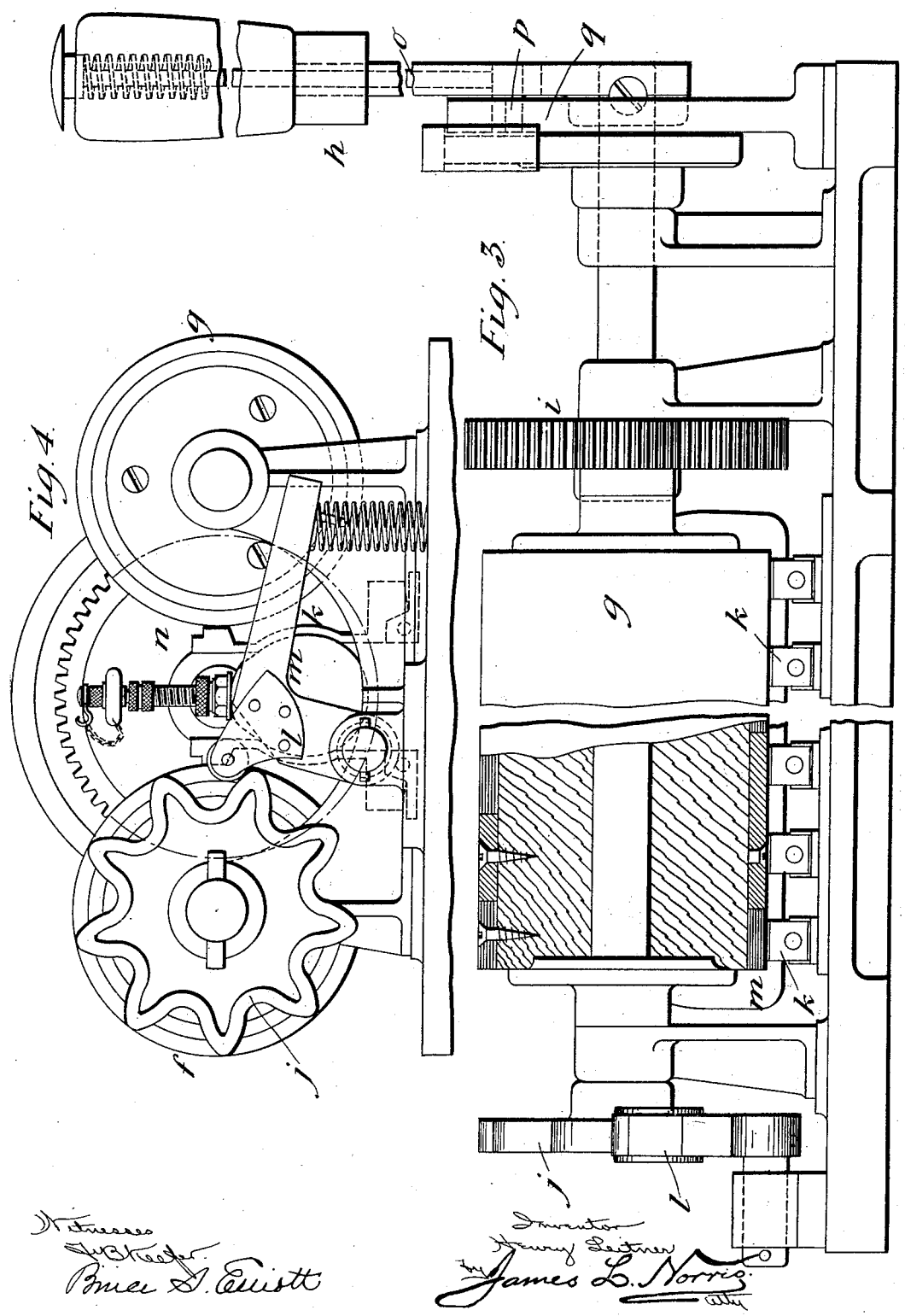

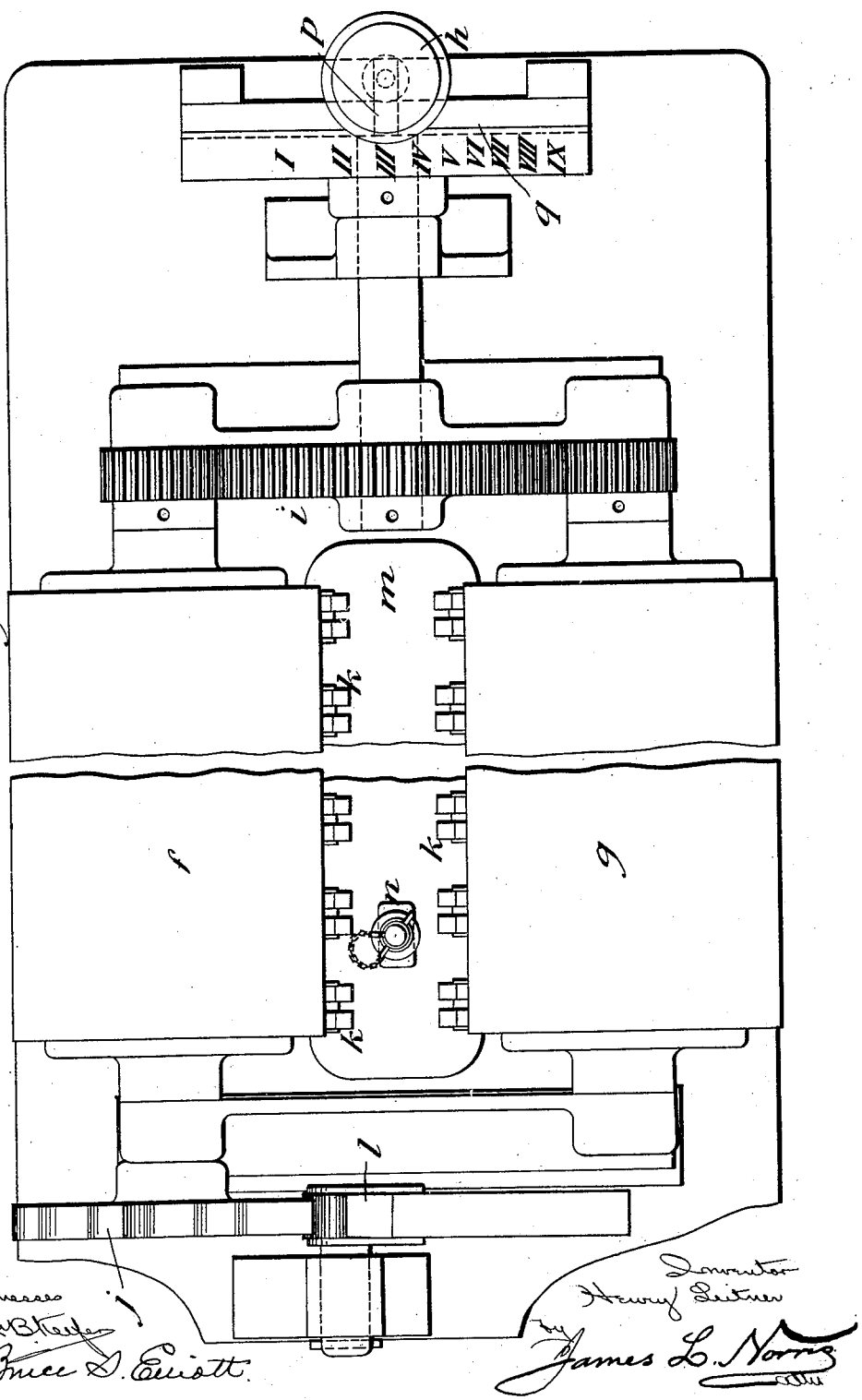

No. 652,124. Patented June 19, 1900.
H. LEITNER.
CONTROLLING ELECTRIC MOTORS AND APPARATUS THEREFOR.
(Application filed July 10, 1899.)
(No Model.) 6 Sheets—Sheet 4.
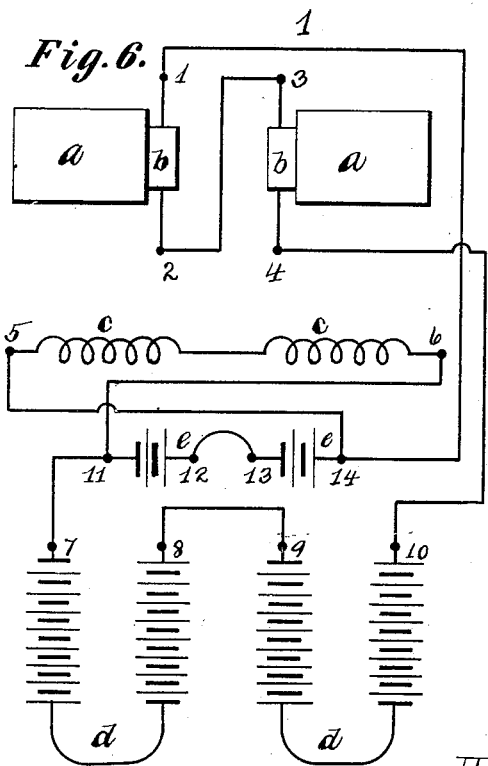
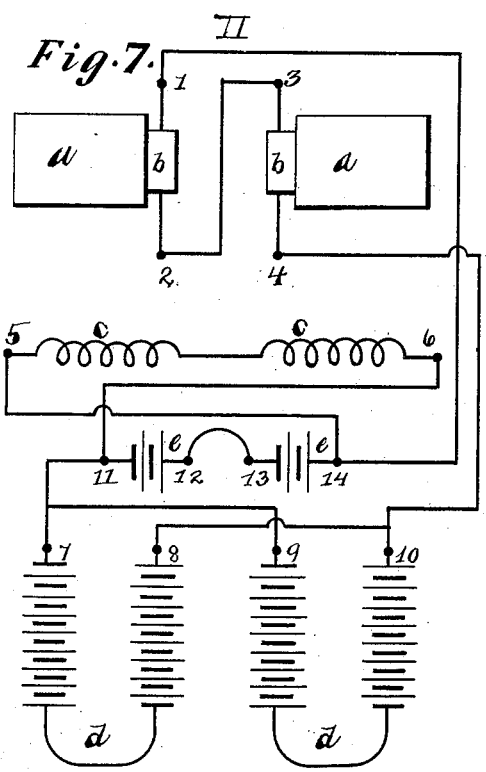
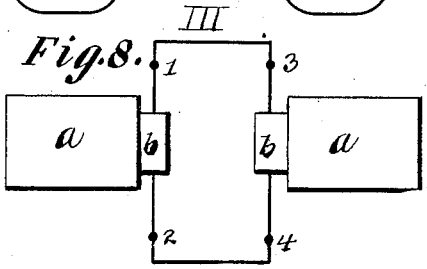
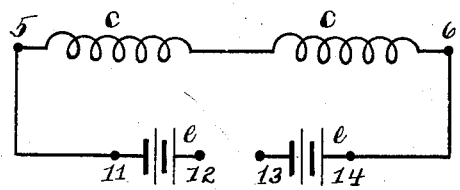
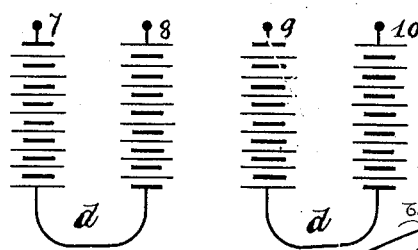
Witnesses Inventor
THE NORRIS PETERS CO., PHOTO-LITHO., WASHINGTON, D. C.

No. 652,124. Patented June 19, 1900.
H. LEITNER.
CONTROLLING ELECTRIC MOTORS AND APPARATUS THEREFOR.
(Application filed July 10, 1899.)
(No Model.) 6 Sheets—Sheet 5.
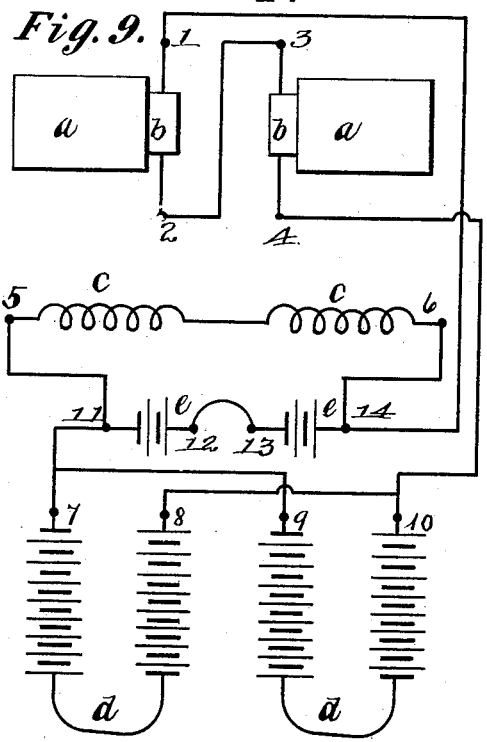
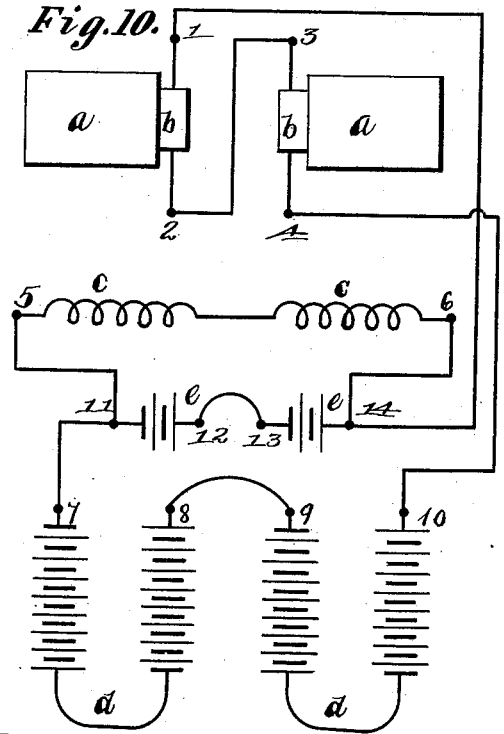
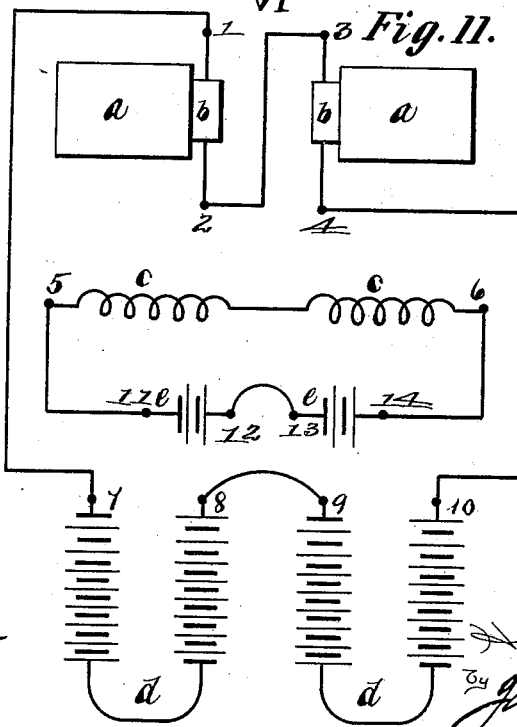
Witnesses
Inventor
Henry Leitner.
by James L. Norris
atty No. 652,124. Patented June 19, 1900.
H. LEITNER.
CONTROLLING ELECTRIC MOTORS AND APPARATUS THEREFOR.
(Application filed July 10, 1899.)
(No Model.) 6 Sheets—Sheet 6.
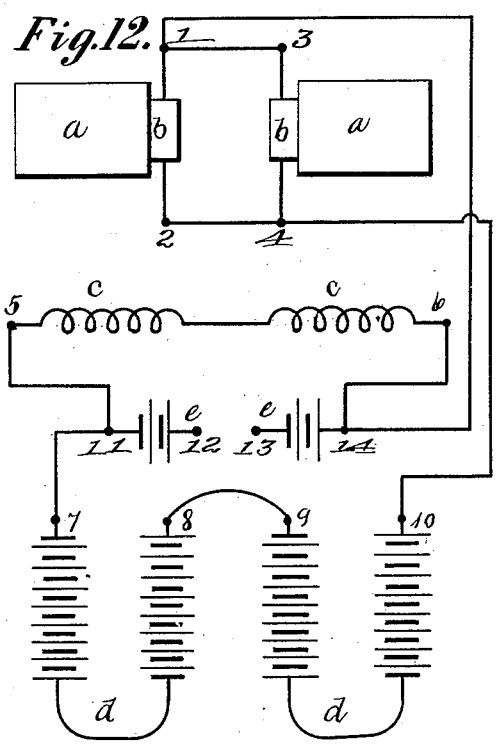
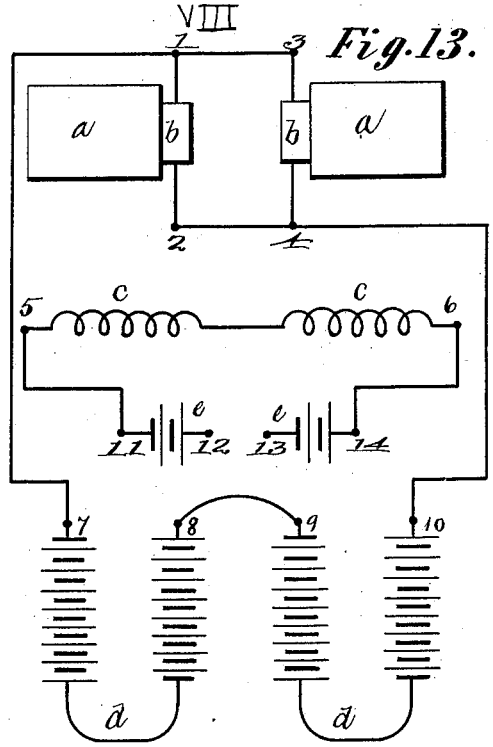
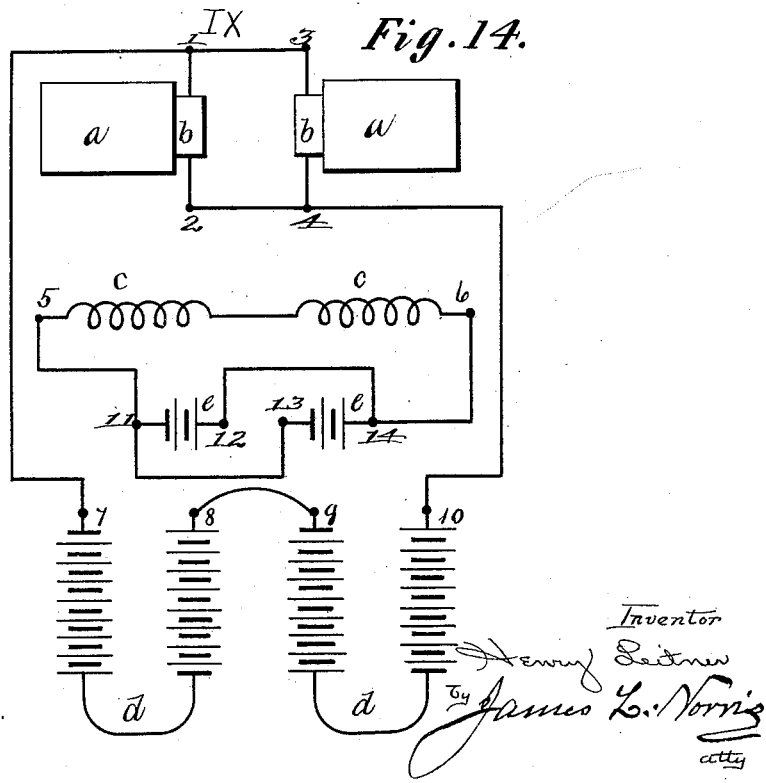

UNITED STATES PATENT OFFICE.

HENRY LEITNER, OF LONDON, ENGLAND.

CONTROLLING ELECTRIC MOTORS AND APPARATUS THEREFOR.

SPECIFICATION forming part of Letters Patent No. 652,124, dated June 19, 1900.

Application filed July 10, 1899. Serial No. 723,399. (No model.)

*To all whom it may concern:*

Be it known that I, HENRY LEITNER, electrical engineer, a citizen of England, residing at 207 Piccadilly, London, England, have invented certain new and useful Improvements in Controlling Electric Motors and Apparatus for that Purpose, (for which I have made application for a patent in Great Britain, dated May 4, 1899, No. 9,414,) of which the following is a specification.

My invention relates to means of controlling electric motors, particularly such as are employed for propelling vehicles.

It comprises an arrangement of motors and generators and apparatus for varying the connections between the motors and the generators, as I shall describe by way of example, referring to the accompanying drawings.

Figure 1 is a diagram of the motors and generators. Fig. 2 shows the surfaces of the two commutator-cylinders developed, with their conducting-segments. Fig. 3 is a side view, partly sectional. Fig. 4 is an end view, and Fig. 5 is a plan, of the controlling-commutator. Figs. 6 to 14, inclusive, are diagrams illustrating the different connections effected by the controller.

Referring to Fig. 1, $a\ a$ are the armatures of two motors. $b\ b$ indicate their commutators, and $c\ c$ the coils of their field-magnets. These two motors may be variously connected to a pair of batteries or generators $d\ d$ and a pair of exciting generators or batteries $e\ e$. Instead of two separate motors a single motor may be employed having two independent windings $a$ and commutators $b$ on a single shaft, which can be grouped in series or in parallel, as can the two separate motors. The main battery or generator is in two parts $d\ d$, which can be placed in series or parallel, and a second and smaller battery, which may consist of four cells, is also divided into two parts $e\ e$. This small battery or exciter is for the field-magnets and is sufficiently strong to keep them powerfully excited independently of the main circuit. The exciter $e\ e$ is placed in the main circuit in opposition to the main generator $d\ d$, or it might be in an independent field-circuit. Besides the various voltages and speeds obtained by different groupings of the armatures and main battery certain intermediate speeds are obtained by transferring the exciter to or from the main circuit. When $e\ e$ is in the main circuit, it is in opposition to the electromotive force of the main battery, reducing its effective voltage; but when $e\ e$ is not in the main circuit the full voltage of the main battery $d\ d$ is utilized. When the exciter $e\ e$ is in circuit with the main battery $d\ d$, the armature-current is supplied almost entirely through it, the resistance of the field being much greater than that of the exciter, and the main current acts so as to charge the exciter to its fullest extent, keeping its voltage up to the extreme limit, and thus highly exciting the field. The exciter also serves to choke off any sudden rush of current to the armature on starting or increasing the voltage. The exciter prevents any danger of reversal of the field, owing to the motor acting as a generator, as may occur in the case of the motors of a vehicle when the vehicle descends a gradient. Any current so generated serves to charge the main battery. The controlling-commutator comprises two cylinders $f\ g$, each having bridging contacts, which are arranged so as to have no cross connections. The two cylinders are turned simultaneously by a handle $h$ and gearing $i$, so as to bring narrow sets of bridges (one set for each grouping of motors and generators) against brushes $k$, connected to the terminals of the motors and generators.

As shown at Fig. 2, there are nine sets of bridge-contacts numbered from I to IX in each group, the similarly-numbered sets in each group being used together. The vertical dotted lines indicate the position of the brushes, and the connections are indicated by numerals corresponding to those marked on Fig. 1, for the various terminals 1 2 3 4 are the armature-brushes, 5 and 6 the field-magnet terminals, 7 8 9 10 are the poles of the main battery, and 11, 12, 13, and 14 are the poles of the exciter. The positions I and II are for backward driving, with the polarity of the field reversed. III is the stopping position, with electric brake. IV to IX are the positions for forward driving, with progressively-increased speed.

It will be observed that Figs. 6 to 14 are respectively marked with Roman numerals I to IX, designating the various positions of the controller corresponding to the similarly-numbered contacts indicated in Fig. 2, which in each of its horizontal lines shows all of the contacts made for each case. Take, for instance, position I, (shown in Fig. 6,) it will be seen in Fig. 2, reading from the left, that 14 is connected to 1, 3 to 2, 4 to 10, 8 to 9, 7 to 11, 13 to 12, 6 to 11, and 14 to 5, and by again referring to diagram I, Fig. 6, all these connections can be thereon traced, and so on for the other positions.

In position I, as shown in Fig. 6, the connections are such that the armatures $a$ are in series, the divisions of both batteries $d$ and $e$ in series, the field $c$ is connected to exciter $e$, and one pole of exciter $e$ is connected to the like pole of the main battery $d$, the other pole of the exciter $e$ being connected to one of the armature-brushes. The main current thus passes to the armature $b$ through exciter $e$ in opposition to its electromotive force.

In position II, as shown in Fig. 7, the only change is that the two parts of the main battery $d\ d$ are in parallel, the voltage, and consequently the speed, being thus reduced.

In position III (see Fig. 8) the armatures $b\ b$ are short-circuited and the field $c$ is excited; but in the direction for forward driving the main batteries $d\ d$ are cut out. In this case any motion of the motor would set up a current in the armature which would resist further motion, and so act as a brake, tending to stop the motor. In position IV (see Fig. 9) the direction of driving is forward, but otherwise similar to II, with field reversed, and position V (see Fig. 10) is similar to I, with field reversed. These give the two slowest forward-driving speeds.

In position VI (see Fig. 11) both the armatures $b\ b$ and the parts $d\ d$ of the main battery are in series; but the exciter $e\ e$ is cut out of the main circuit and forms an independent circuit with the field. The battery-pole 7 is directly connected to brush 1.

In position VII (see Fig. 12) the armatures $b\ b$ are in parallel, while $d\ d$ remain in series, and the exciter $e\ e$ is again introduced.

In position VIII (see Fig. 13) the connections are as in VI, but with the armatures in parallel, the exciter $e\ e$ being in an independent circuit.

In position IX (see Fig. 14) the connections are as in VIII; but the two parts of the exciter $e\ e$ are in parallel and the field is therefore weakened, as the voltage of the exciter is not sufficient to excite the field fully except when all its cells are in series. This position gives the highest attainable speed. As the full voltage of the main generator is utilized the armatures are in parallel and the field is reduced in strength.

In order that the cylinders $f$ and $g$ when they are turned by the handle $h$ may always take such a position that the brushes $k$ are on the contact-pieces, one of the cylinders has on its axis a star-wheel $j$, the teeth of which are engaged by a spring-pawl $l$, having a roller which, springing in between two of the teeth of $j$, brings the cylinders to rest in the proper position. Between the two cylinders are the brushes $k$, which are hinged at their lower ends and are pressed against the two cylinders $f\ g$ by the pneumatic cylinder $m$, which is inflated through a valve $n$. Thus the brushes are pressed quite evenly on the cylinders, and separate springs are not required. In order to retain the controlling-commutator in the position for stopping and to prevent accidental reversal, the handle $h$ has a spring-rod $o$, with a projection $p$ at its lower end, which engages in a notch inside a saddle-piece $q$, which is concentric with the operating-spindle. To move the handle from this position, the button at the top of the rod $o$ has to be pressed down.

An indicating-plate is provided, having on it the numbers I to IX, so that the operator can see at a glance the position of the controlling-commutator.

Having thus described the nature of this invention and the best means I know of carrying the same into practical effect, I claim—

1. For controlling electric motors, the combination of a main battery in two parts, a smaller battery also made in two parts and having its poles in opposition to the main battery when connected thereto, a pair of motors, and a controlling-commutator adapted to effect various connections of the batteries and motors, substantially as described.

2. A controlling-commutator comprising two cylinders geared together so as to be simultaneously revolved, these cylinders being provided with bridging-contacts having pairs of brushes which are mounted between the cylinders pressed against them by an inflated pneumatic tube, substantially as described.

In testimony whereof I have hereunto set my hand in presence of two subscribing witnesses.

HENRY LEITNER.

Witnesses:
A. M. GLASS,
WALTER J. SKERTEN.